United States Patent
Coyle

(10) Patent No.: US 10,631,679 B2
(45) Date of Patent: Apr. 28, 2020

(54) REBOUND GARLIC PEELING APPARATUS AND METHOD

(71) Applicant: Neal David Coyle, Littleton, CO (US)

(72) Inventor: Neal David Coyle, Littleton, CO (US)

(*) Notice: Subject to any disclaimer, the term of this patent is extended or adjusted under 35 U.S.C. 154(b) by 0 days.

(21) Appl. No.: 15/474,664

(22) Filed: Mar. 30, 2017

(65) Prior Publication Data
US 2017/0280911 A1    Oct. 5, 2017

Related U.S. Application Data

(60) Provisional application No. 62/317,499, filed on Apr. 2, 2016.

(51) Int. Cl.
*A47J 17/02*    (2006.01)

(52) U.S. Cl.
CPC .................... *A47J 17/02* (2013.01)

(58) Field of Classification Search
CPC . A47J 17/02; A47J 17/16; A47J 17/00; A23N 7/02; A23N 15/04; A23N 15/08; A23N 7/00; A23N 7/026; A23N 4/04; A23N 5/002; A23N 7/04
USPC ........... 99/584, 537, 538; 426/482, 479, 483
See application file for complete search history.

(56) References Cited

U.S. PATENT DOCUMENTS

| | | | |
|---|---|---|---|
| 2005/0120892 A1* | 6/2005 | McKee ................ | A47J 17/02 99/584 |
| 2015/0208714 A1* | 7/2015 | Ramos ................ | A23N 15/08 426/483 |

OTHER PUBLICATIONS

Plastic definition, rubberlike definition (Year: 2019).*

* cited by examiner

*Primary Examiner* — Hong T Yoo
(74) *Attorney, Agent, or Firm* — William Intellectual Property; Benjamin F. Williams

(57) ABSTRACT

A rebound garlic peeling apparatus is presented having an elastomeric, rubberlike, spherical member separable into halves. A first hemispherical section is therefore securable to a second hemispherical section to encapsulate a hollow center. An interior layer, disposed bounding the hollow center when each of the first and second hemispherical members are secured together, is forced to contact garlic cloves enclosed therein when the spherical member is accelerated against a proximal surface. Tractive engagement of the interior layer against the garlic cloves effects separation of the garlic tunic and sheath from the cloves whereby the cloves are expediently peeled by bouncing the spherical member previous to culinary preparation. Force of impact is absorbed predominantly into the spherical member whereby any bruising of the cloves is minimized.

8 Claims, 5 Drawing Sheets

REBOUND GARLIC PEELING APPARATUS AND METHOD

CROSS-REFERENCE TO RELATED APPLICATIONS

This nonprovisional application for utility patent claims the benefit of provisional application Ser. No. 62/317,499 filed on Apr. 2, 2016

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of peelers for garlic are known in the art. Most result in crushing garlic to effect separation of the tunic and sheath from the cloves. Some enable rolling of cloves within tubular structures whereby traction effected by contact of an interior surface, in conjunction with some pressure, assists in separating the tunic and sheath from the cloves inserted into the tubular structure. Other peelers rely on crushing the garlic entirely, whereby the tunic and sheath, comprising more desiccated tissue, are not passed through apertures wherethrough garlic cloves are apt to pass when forced under pressure. Each of these systems and apparatuses requires selection of a unit of garlic and specific positioning of at least one clove into a particular structure to effect peeling sequentially. None enable peeling of an entire bulb of garlic, absent obliterating the bulb against a work surface with a mallet and thereby intermingling the tunic, sheaths, and mashed cloves.

What is needed is a rebound garlic peeling apparatus that enables position of whole bulbs of garlic (as well as individual cloves, when desired) interior to an elastomeric, rubberlike, hollow spherical member, whereby acceleration of the spherical member thrown against a surface effects bouncing of the spherical member to loosen the bulb apart and effect forcing of the tunic and sheath from the garlic cloves. An expedient and enjoyable means of peeling even entire bulbs of garlic is thereby enabled previous to culinary preparation. Force of impact is absorbed by the spherical member whereby the garlic is not bruised. Further, removal of peeled cloves intact (in that cloves are not crushed or macerated) enables slicing and dicing of garlic for culinary preparation, when preferred.

FIELD OF THE INVENTION

The present invention relates to garlic peelers, and more particularly to a rebound garlic peeling apparatus and method devised to enable an expedient and enjoyable means of peeling garlic previous to culinary preparation without crushing, macerating, or appreciably bruising the garlic cloves.

The present invention includes an elastomeric, rubberlike, hollow spherical member separable into halves wherein an entire bulb of garlic is positionable interior to a hollow center encapsulated by the spherical member. Forced bouncing of the spherical member effects agitation of the garlic interior to the spherical member, and forced contact of the garlic with an interior layer having a high coefficient of friction effects removal of the tunic from the garlic bulb and separation of the sheath from each clove whereby peeled cloves are readily retrievable from the hollow center subsequent bouncing of the spherical member.

Thus an expedient, satisfying, and enjoyable method of peeling garlic is enabled whereby a user may peel entire bulbs of garlic, when desired, with minimal time and energy expended.

SUMMARY OF THE INVENTION

The present rebound garlic peeling apparatus has been devised to enable expedient peeling of garlic previous to culinary preparation. The present rebound garlic peeling apparatus encompasses at least one clove of garlic interior to a hollow center enclosable within an elastomeric spherical member whereby acceleration and impact of the spherical member effects frictional engagement of the at least one clove against an interior layer whereby traction of the interior layer in contact against said at least one clove forces separation of the tunic and sheath from said at least one clove.

The term "tunic", as used herein throughout, is taken to mean the outermost layer of a garlic bulb. The term "sheath", as used herein throughout, is taken to mean the epidermal cells encasing each clove (also known as "scales"). The term "high coefficient of friction", as used herein, is defined as a surface or layer exhibiting a coefficient of friction in the range of at least 0.25 (that of wood) to above 1.16 (rubber).

The present rebound garlic peeling apparatus, therefore, includes a spherical member having a hollow center, said spherical member separable into a first hemispherical section and a second hemispherical system along a transverse medial axis bisecting the spherical member into halves. The first hemispherical section includes a nested interior hemisphere disposed concavely thereupon, which interior hemisphere includes a male threaded section disposed projected perpendicularly beyond a sealable rim disposed transversely delimiting the first hemispherical section circumferentially bounding the hollow center.

The second hemispherical section also includes a nested interior hemisphere disposed concavely thereupon, which interior hemisphere includes a female threaded section disposed circumferentially thereabouts immediately underlying a sealable rim likewise transversely delimiting the second hemispherical section circumferentially bounding the hollow center.

Each of the first and second hemispherical sections are therefore rotationally securable by threaded engagement of the male threaded section into the female threaded section whereby relative rotation of the first and second hemispherical sections in each of a corresponding (but opposite) first direction seats each of said first and second hemispherical sections together conjunct at each sealable rim.

An interior layer is disposed exteriorly upon each of the nested interior hemispheres of each of the corresponding first and second hemispherical sections. The interior layer includes a high coefficient of friction whereby the interior layer presents a tractive surface when contacting an object placed into the hollow center. A user may, therefore, place at least one clove of garlic into the hollow center and secure each of the first and second hemispherical sections together. Once enclosed interior to the spherical member, the at least one clove is brought into contact with the interior layer by agitation of the spherical member. Friction engendered by contacting the interior layer results in separation of the tunic and sheath from the at least one clove whereby subsequent opening of the spherical member presents the at least one clove conveniently peeled for use.

The present rebound garlic peeling apparatus is rubberlike and elastomeric whereby the spherical member is bounceable against a surface. Accelerating the spherical member, therefore, against a surface causes the at least one clove interiorly disposed to impact against the interior layer. Bouncing the spherical member against a surface further enables abrupt changes in velocity wherein the at least one clove is agitated and forced into further and repeated contact with the interior layer whereby the tunic and sheath are forcible away from the at least one clove.

Further, the present rebound garlic peeling apparatus is devised to accommodate a bulb of garlic, whereby impact of the spherical member against a proximal surface loosens the cloves comprising the bulb, strips away the tunic, and separates the sheath from each clove, whereby an expedient method of peeling quantities of garlic is enabled. The force of impact is generally absorbed by the spherical member whereby bruising of the garlic is minimized during agitation within the spherical member. Inertia of the accelerated garlic forces contact of the garlic against the interior layer, but the impact force is absorbed into the spherical member. The spherical member may therefore warm some on an exterior surface thereof and undergo temporary deformation during impact previous to elastically rebounding. Change of velocity of the garlic, effected by impact of the spherical member, forces further contact against the interior layer, whereby stripping of the tunic and sheath from each of the cloves is effected without appreciable bruising of the cloves. The result is a fun and fast method of peeling garlic previous to culinary preparation.

Thus has been broadly outlined the more important features of the present rebound garlic peeling apparatus so that the detailed description thereof that follows may be better understood and in order that the present contribution to the art may be better appreciated.

Objects of the present rebound garlic peeling apparatus, along with various novel features that characterize the invention are particularly pointed out in the claims forming a part of this disclosure. For better understanding of the rebound garlic peeling apparatus, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
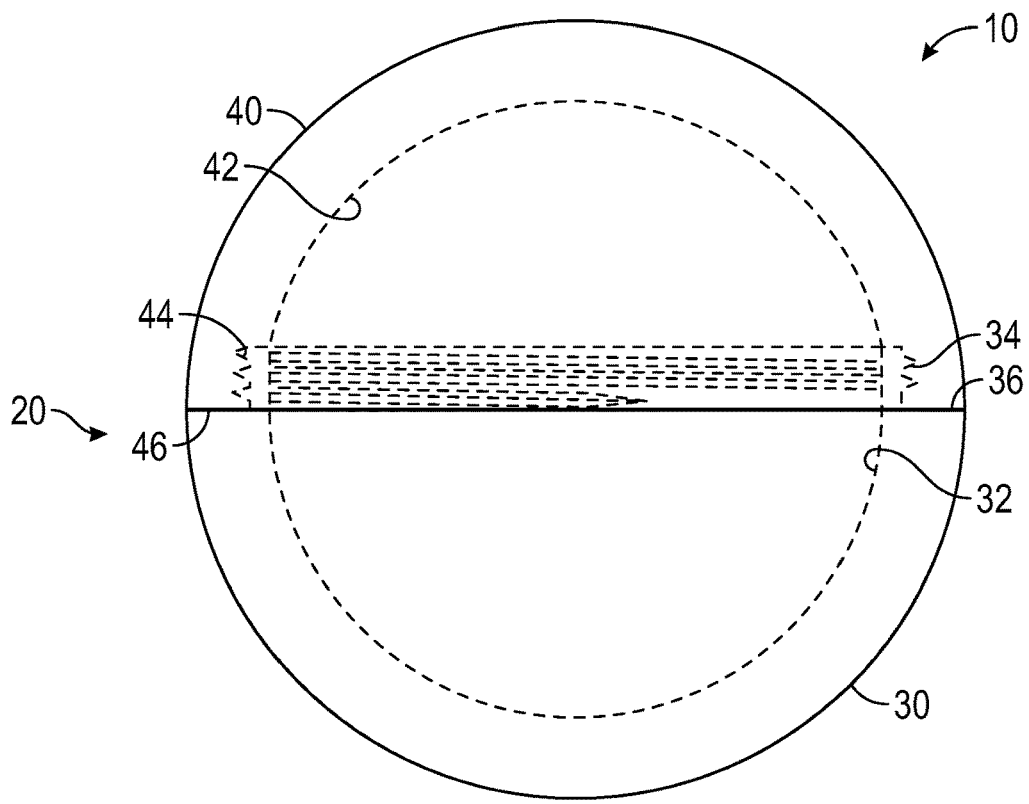
FIG. 1 is a side view of an example embodiment with detail illustrated of a male threaded section and female threaded section engaging each of a first hemispherical section in conjunction with a second hemispherical section conjunct at a sealable rim.

With reference now to the drawings, and in particular FIGS. 1 through 7 thereof, example of the instant rebound garlic peeling apparatus employing the principles and concepts of the present rebound garlic peeling apparatus and generally designated by the reference number 10 will be described.

Referring to FIGS. 1 through 7 a preferred embodiment of the present rebound garlic peeling apparatus 10 is illustrated.

The present rebound garlic peeling apparatus 10 has been devised to enable expedient peeling of garlic cloves 102 and bulbs 100 previous to culinary preparation. Separation of the bulb 100 and removal of the tunic 200 and sheath 202 from cloves 102 is effective by frictional engagement of at least one clove 102 against an interior layer 50 disposed upon a elastically reboundable polymeric hollow spherical member 20, whereby agitation of the spherical member 20 effects frictional engagement of the bulb 100 against the interior layer 50 loosening the bulb 100 and removing the tunic 200 and sheath 202 from each clove 102. Agitation of the spherical member 20 is effected by bouncing the spherical member 20 against a surface.

The rebound garlic peeling apparatus 10, therefore, includes an elastically rebounding, polymeric, hollow, spherical member 20 separable into halves for reception of at least one clove 102 of a garlic bulb 100 into a hollow center 22 enclosable therein. The spherical member 20 includes a first hemispherical section 30 and a second hemispherical section 40, securable together along a medial transverse axis bisecting the spherical member 20 into halves. The first hemispherical member 30 includes a nested interior hemisphere 32 concavely disposed thereupon. The nested interior hemisphere 32 presents a male threaded section 34 disposed extended beyond a sealable rim 36, said sealable rim 36 disposed circumferentially bounding the first hemispherical section 30 transversely around the hollow center 22.

The second hemispherical section 40 also includes a nested interior hemisphere 42 concavely disposed thereupon, said nested interior hemisphere 42 having a female threaded section 44 disposed below a sealable rim 46 transversely disposed delimiting the second hemispherical section 40 around the hollow center 22. The first hemispherical section 30 is thereby securable to the second hemispherical section 40 by rotational engagement of the male threaded section 34 seating into the female threaded section 44.

The interior layer 50 is interiorly disposed concavely upon each of the first and second hemispherical sections 40, 40 overlying each respective interior hemisphere 32, 42. The interior layer 50 includes a high coefficient of friction devised for abrasive contact and tractive engagement against the at least one clove 102 when the spherical member 20 is agitated. Acceleration of the at least one clove 102 relative the interior layer 50 thus engenders frictional contact between the at least one clove 102 and the interior layer 50 whereby the tunic 200 and sheath 202 of said clove 102 is separated from the at least one clove 102. At least one peeled clove 102 is thus retrievable by a user when the first and second hemispherical sections 30, 40 are subsequently separated.

An entire garlic blub 100 is positionable within the hollow center 22 interior to the spherical member 20 when each of the first and second hemispherical sections 30, 40 is rotationally engaged in a relative first direction and secured together by threadable engagement of the male and female threaded sections 34, 44 disposed upon each corresponding interior hemisphere 32, 42. Conjunction of each sealable rim 36, 46 is thereby tautly maintained by threaded engagement of each of the first and second hemispherical sections 30, 40 together. Rotation of each of the first and second hemispherical sections 30, 40 in a relative second direction therefore enables release of the first and second hemispherical sections 30, 40 and separation of the spherical member 20 into halves.

The present rebound garlic peeling apparatus 10 is usable to encompass an entire bulb of garlic 100 within the hollow center 22 of the spherical member 20. Subsequent acceleration of the spherical member 20 accelerates the garlic bulb 100 and impact of the spherical member 20 effects impact and contact of the garlic bulb 100 against the interior layer 50. Further, elastic rebound of the spherical member 20 effects abrupt changes in velocity whereby the spherical member 20 is repeatably bounceable to effect complete separation of the cloves 102 comprising the garlic bulb 100 and, also, separation of the exterior tunic 200 and sheath 202 from each clove 102. A user may therefore place a desired quantity of garlic—comprising at least one clove—interior to the spherical member 20 and expediently peel said at least one clove 102 by causing the spherical member 20 to bounce at least once.

Figure 2:
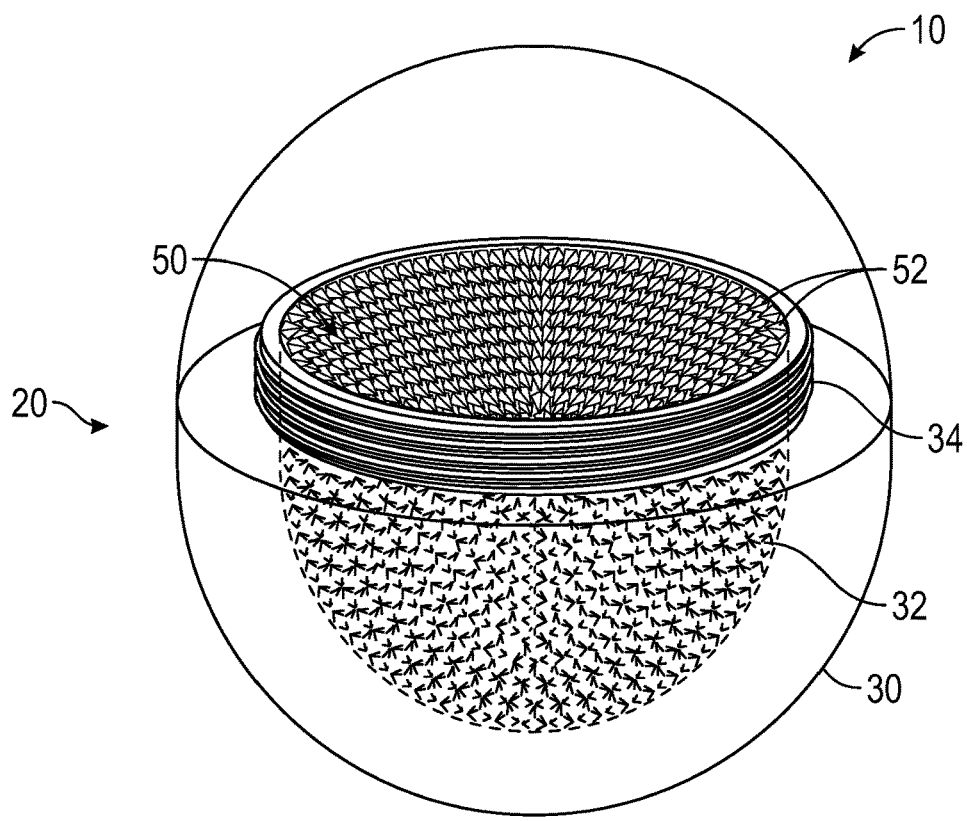
FIG. 2 is an isometric view of an example embodiment depicting an interior layer having a plurality of protuberances thereon.
Figure 3:
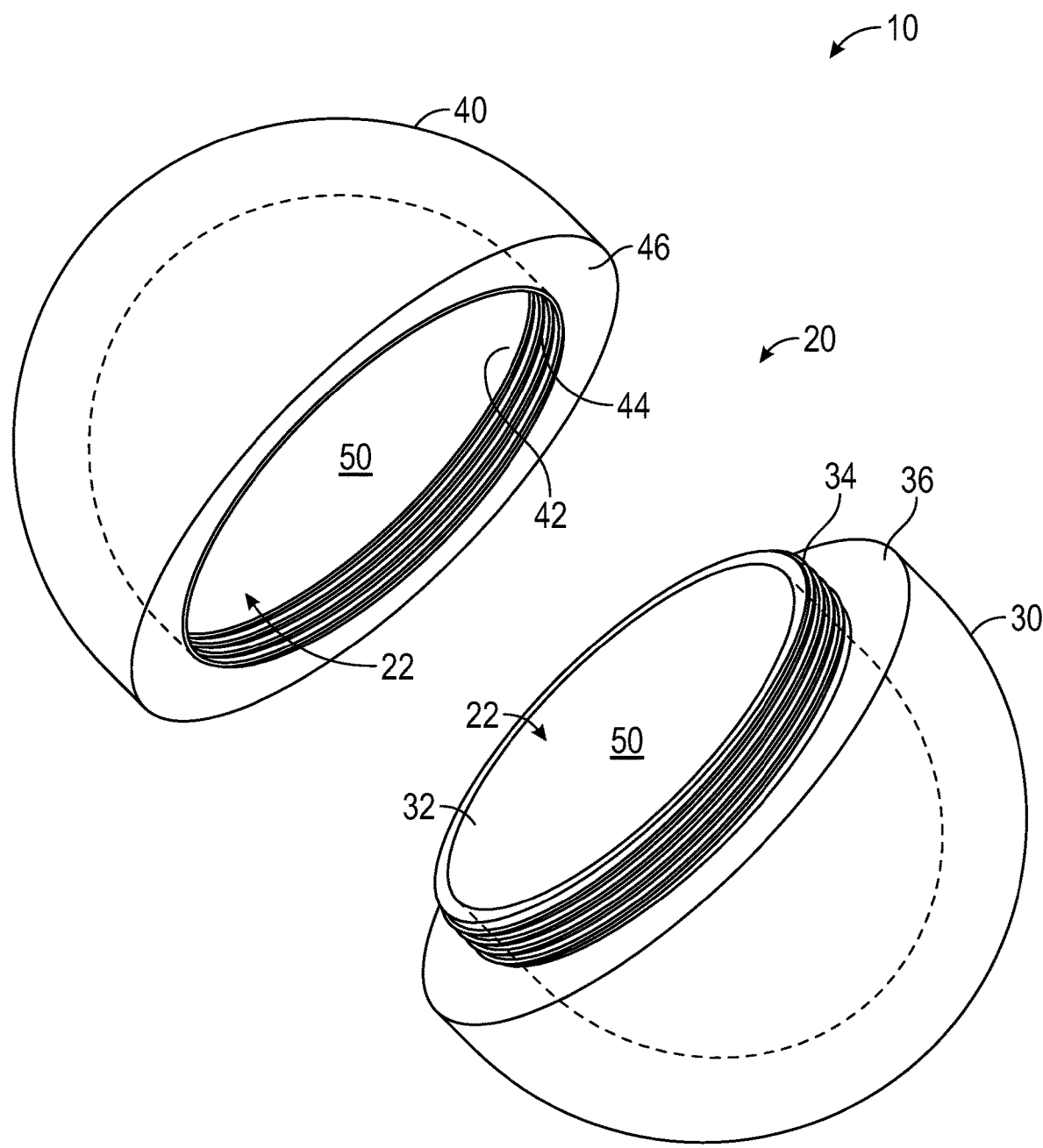
FIG. 3 is an isometric view of an example embodiment illustrating the first and second hemispherical sections separated and without the plurality of protuberances disposed upon the interior layer.
Figure 4:
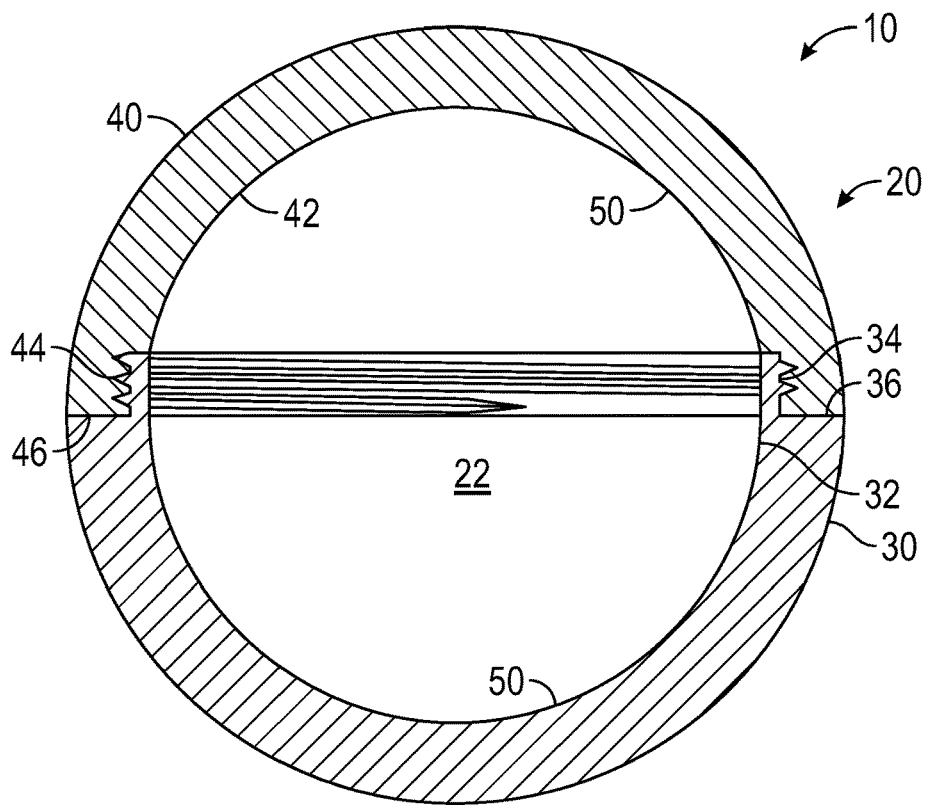
FIG. 4 is a cross section view of an example embodiment.
Figure 5:
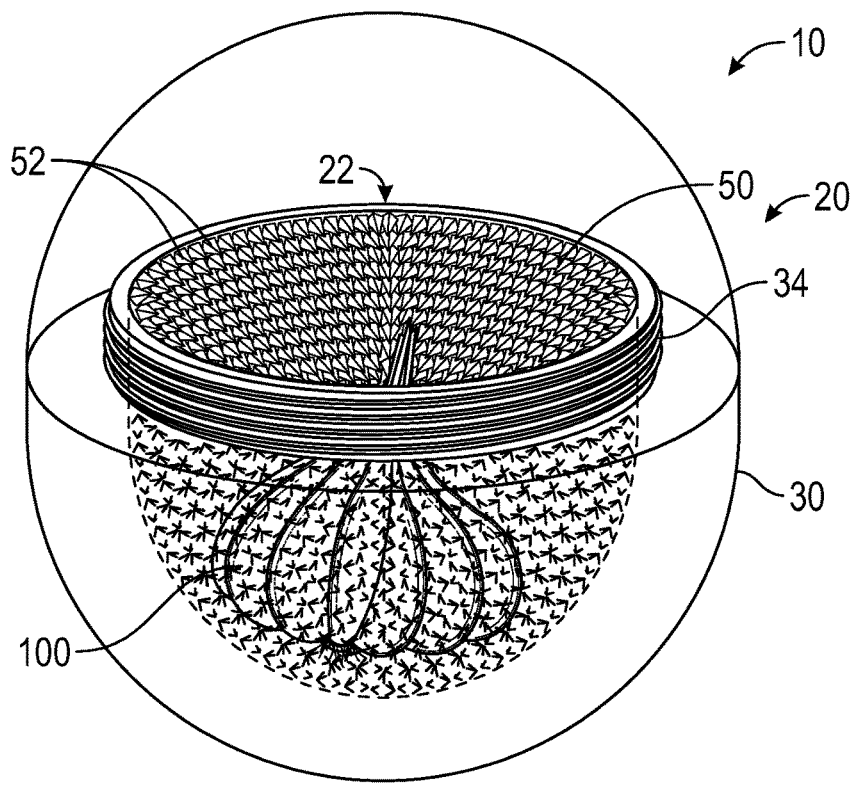
FIG. 5 is an in-use view illustrating a bulb of garlic disposed within a hollow center.
Figure 6:
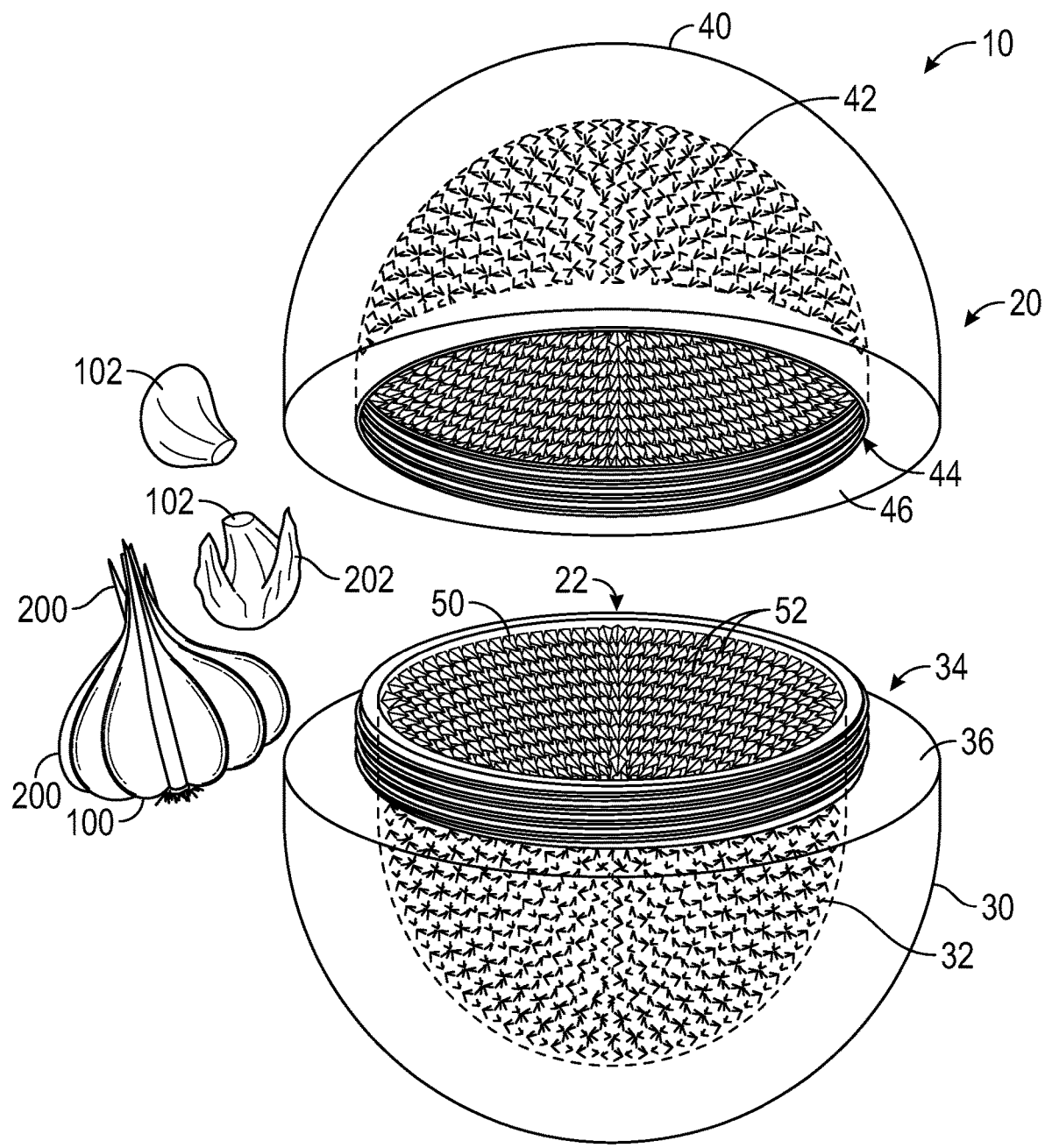
FIG. 6 is an isometric view of an example embodiment illustrating the first hemispherical section separated from the second hemispherical section and depicting the plurality of protuberances upon the interior layer.
Figure 7:
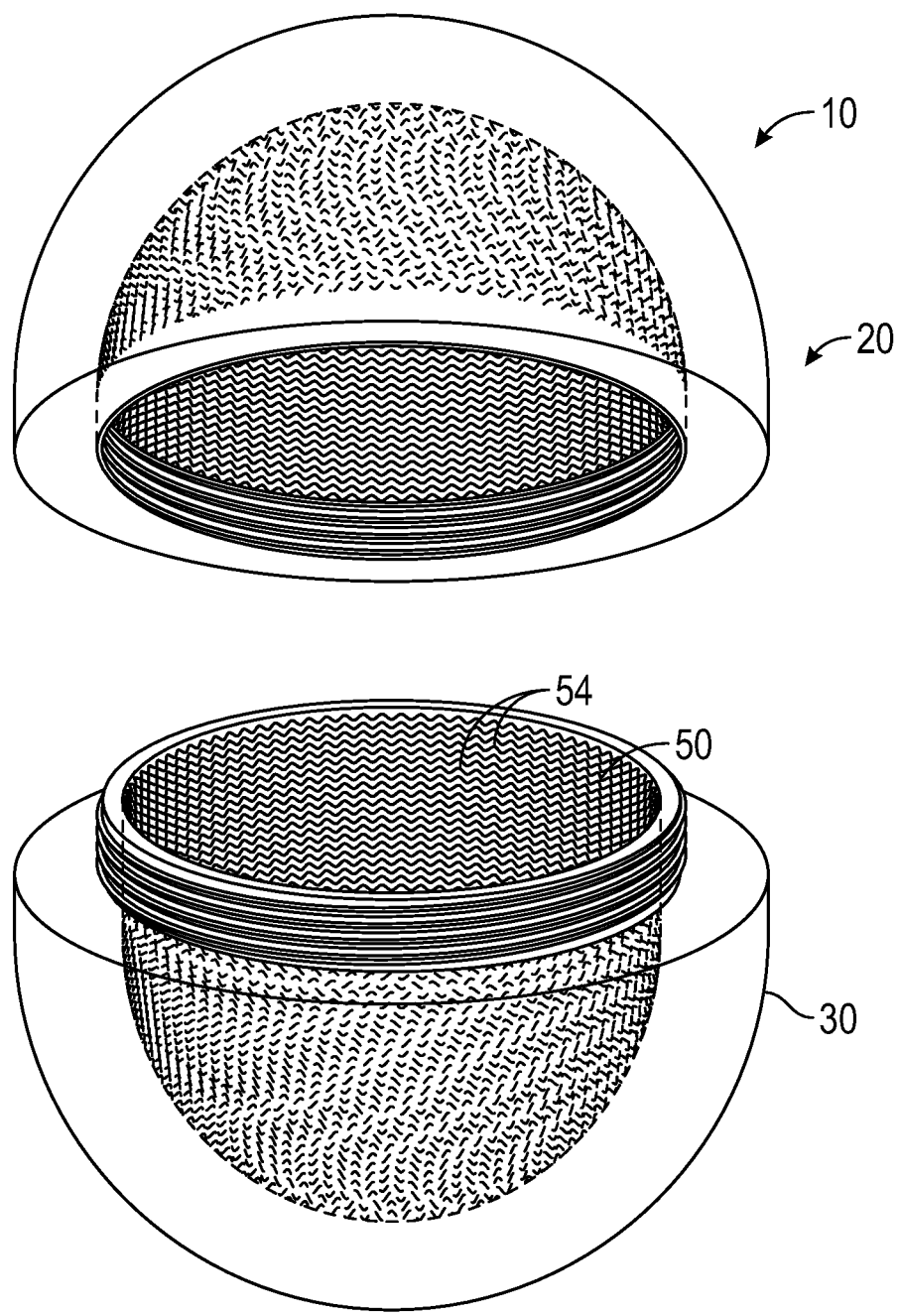
FIG. 7 is an isometric view of an example embodiment illustrating the first hemispherical section separated from the second hemispherical section and depicting a plurality of ridges disposed upon the interior layer.

In an example embodiment depicted herein, the interior layer 50 may include a plurality of protuberances 52 to increase frictional contact against at least one clove 102 encompassed within the hollow center 22 when the spherical member 20 is bounced (see for example FIGS. 2, 5, and 6). In another example embodiment depicted herein, the plurality of protuberances 52 may be devised as a plurality ridges 54 (see FIG. 7, for example). Additionally textures disposed upon the interior layer 50 are contemplated as part of this disclosure whereby the coefficient of friction of the interior layer 50 is increasable thereby.

What is claimed is:

1. A bounceable garlic peeling apparatus configured to peel garlic when bounced against a surface, said apparatus comprising:
   a bouncy, hollow, spherical member separable into halves; and
   an interior layer disposed interiorly upon the spherical member, said interior layer having a high coefficient of friction;
   wherein at least one garlic clove placed interiorly encompassed within the spherical member is stripped of a tunic and sheath when the spherical member is bounced against a surface to present at least one peeled clove when the spherical member is subsequently separated into halves.

2. The bounceable garlic peeling apparatus of claim 1 wherein the spherical member comprises:
   a first hemispherical section, said first hemispherical section including a nested interior hemisphere presenting a male threaded section disposed above a sealable rim of the first hemispherical section; and
   a second hemispherical section, said second hemispherical section including a nested interior hemisphere having a female threaded section disposed below a sealable rim of the second hemispherical section;
   wherein the male threaded section engages into the female threaded section and the first hemispherical section is rotationally securable to the second hemispherical section to effect conjunction of each sealable rim.

3. The bounceable garlic peeling apparatus of claim 2 wherein the interior layer includes a plurality of protuberances.

4. The bounceable garlic peeling apparatus of claim 2 wherein the interior layer includes a plurality of ridges.

5. A bounceable garlic peeling apparatus configured to peel garlic when bounced against a surface, said apparatus comprising a bouncy, rubberlike, polymeric, hollow, spherical member separable into halves, said spherical member having:
   a first hemispherical section including a nested interior hemisphere presenting a male threaded section disposed above a sealable rim of the first hemispherical section;
   a second hemispherical section including a nested interior hemisphere having a female threaded section disposed below a sealable rim of the second hemispherical section; and
   an interior layer disposed concavely upon each of the interior hemispheres of each of the first and second hemispherical sections, said interior layer having a high coefficient of friction;
   wherein at least one clove is positionable interior to the spherical member when the first and second hemispherical sections are rotationally engaged and secured together by threadable engagement to effect conjunction of each sealable rim and a tunic and sheath of the at least one clove is separable by frictional engagement against the interior layer when the spherical member is bounced against a surface whereby at least one peeled clove is retrievable by a user when the first and second hemispherical sections are subsequently separated.

6. The bounceable garlic peeling apparatus of claim 5 wherein the interior layer includes a plurality of protuberances.

7. The bounceable garlic peeling apparatus of claim 5 wherein the interior layer includes a plurality of ridges.

8. A method of peeling garlic comprising the steps of:
   placing a bulb of garlic into a hollow center of an elastomeric, rubberlike, hollow spherical member, said hollow center bounded by an interior layer having a high coefficient of friction; and
   bouncing the spherical member against a surface;
   wherein the bulb is loosened by said impact and each of a plurality of cloves comprising the bulb is separable thereby, whereby a tunic and sheath of each of the plurality of cloves is forcible from each of the plurality of cloves by tractive contact against the interior layer.

* * * * *